United States Patent
Schultz

(10) Patent No.: US 7,226,262 B2
(45) Date of Patent: *Jun. 5, 2007

(54) LOBED DRIVE FOR HI-LITE FASTENER

(75) Inventor: Dennis Schultz, San Juan Capistrano, CA (US)

(73) Assignee: Hi-Shear Corporation, Torrance, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 10/749,044

(22) Filed: Dec. 29, 2003

(65) Prior Publication Data

US 2005/0135899 A1    Jun. 23, 2005

Related U.S. Application Data

(63) Continuation of application No. 10/171,475, filed on Jun. 13, 2002, now Pat. No. 6,736,580, which is a continuation-in-part of application No. 10/052,238, filed on Jan. 16, 2002, now Pat. No. 6,655,888.

(51) Int. Cl.
   *F16B 23/00*    (2006.01)
(52) U.S. Cl. .................................... 411/403
(58) Field of Classification Search ............. 411/402, 411/403, 408, 410
   See application file for complete search history.

(56) References Cited

U.S. PATENT DOCUMENTS

| | | | |
|---|---|---|---|
| 960,244 A | * | 6/1910 | Allen ................ 470/16 |
| 2,969,250 A | | 1/1961 | Kull |
| 3,584,667 A | | 6/1971 | Reiland |
| 3,695,124 A | | 10/1972 | Myers |
| 3,872,904 A | * | 3/1975 | Barlow ................ 81/460 |
| 3,885,480 A | | 5/1975 | Muenchinger |
| 4,073,160 A | * | 2/1978 | Perret ................ 464/158 |

(Continued)

FOREIGN PATENT DOCUMENTS

CN        1615406 A        11/2005

(Continued)

OTHER PUBLICATIONS

International Search Report mailed Sep. 18, 2003.

(Continued)

*Primary Examiner*—Flemming Saether
(74) *Attorney, Agent, or Firm*—Fulwider Patton LLP

(57) ABSTRACT

A drive socket for a male threaded fastener includes a plurality of rounded lobes of equal radius which are located equidistant from the center of the fastener and an equal distance from each other. The drive socket also includes flat surfaces located opposite the lobes and equidistant from the center of the fastener. Another embodiment of a drive socket includes a first set of lobes and a second set of lobes, each lobe being of equal radius and equidistant from the center of the fastener. The lobes of the first set are equidistant apart and the lobes of the second set are also equidistant apart and equidistant apart from the adjacent lobes of the first set on either side of the lobe of the second set. Each of the lobes of the first set includes a flat surface which is adjacent and tangential to the radius portion of the lobe.

5 Claims, 2 Drawing Sheets

U.S. PATENT DOCUMENTS

| | | |
|---|---|---|
| 4,367,664 A | 1/1983 | Ekshtut |
| 4,459,074 A | 7/1984 | Capuano |
| 4,512,220 A | 4/1985 | Barnhill, III |
| 4,882,957 A | 11/1989 | Wright et al. |
| 4,930,378 A * | 6/1990 | Colvin ............... 81/121.1 |
| 4,947,712 A | 8/1990 | Brosnan |
| 5,012,706 A | 5/1991 | Wright et al. |
| 5,174,704 A | 12/1992 | Kazino et al. |
| 5,219,392 A * | 6/1993 | Ruzicka et al. ........ 81/124.3 |
| 5,277,531 A | 1/1994 | Krivec |
| 5,388,486 A | 2/1995 | Ruzicka et al. |
| 5,481,948 A | 1/1996 | Zerkovitz |
| 5,577,871 A | 11/1996 | Brugola |
| 5,765,980 A | 6/1998 | Sudo et al. |
| 5,797,659 A | 8/1998 | Fuller |
| 5,960,681 A | 10/1999 | Anderson et al. |
| 6,003,411 A | 12/1999 | Knox et al. |
| 6,016,727 A | 1/2000 | Morgan |
| 6,098,501 A | 8/2000 | Sundstrom |
| 6,131,493 A | 10/2000 | Yamamoto et al. |
| 6,343,531 B2 | 2/2002 | Amis |
| 6,367,358 B1 | 4/2002 | Stacy |
| 6,632,057 B1 * | 10/2003 | Fauchet ............... 411/403 |
| 6,655,888 B2 * | 12/2003 | Schultz ............... 411/403 |
| 6,736,580 B2 * | 5/2004 | Schultz ............... 411/403 |

FOREIGN PATENT DOCUMENTS

| | | |
|---|---|---|
| DE | 43 21 325 | 1/1995 |
| DE | 296 18 994 | 12/1996 |
| GB | 2 061 439 | 5/1981 |
| GB | 2335962 A | 6/1999 |
| WO | WO 98 07995 | 2/1998 |
| WO | WO 01/32365 A | 10/2001 |

OTHER PUBLICATIONS

International Search Report, dated Mar. 21, 2003.

* cited by examiner

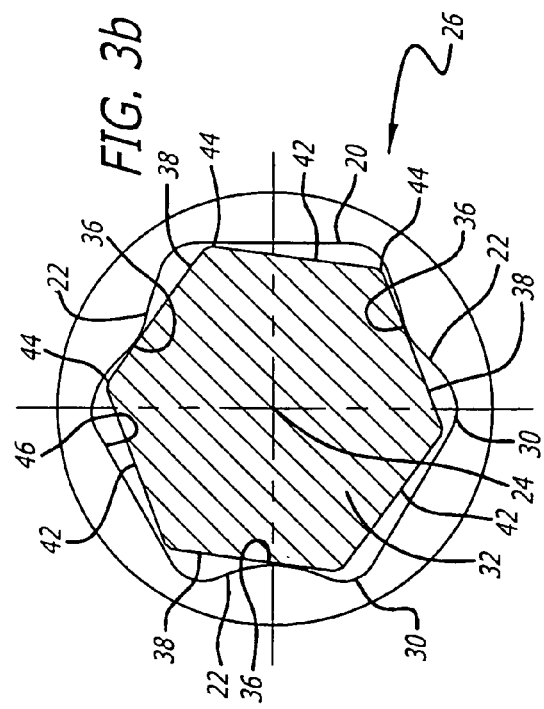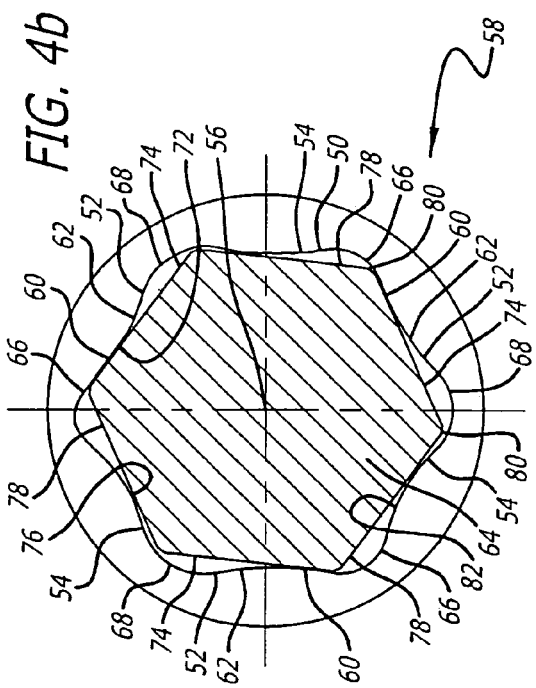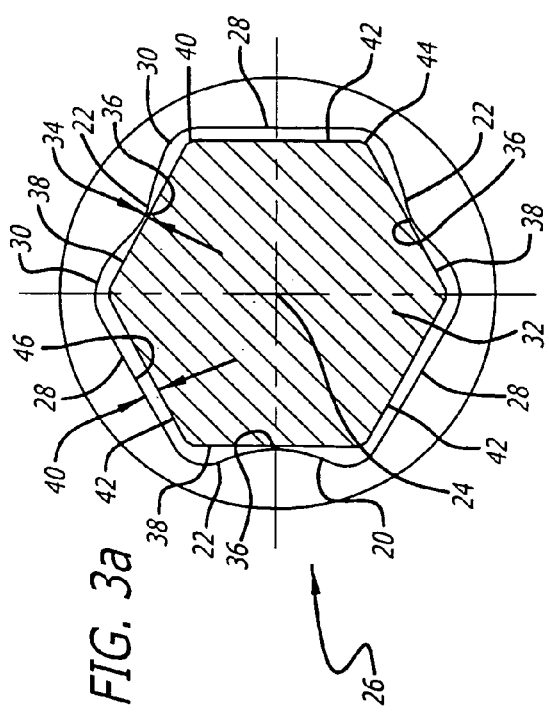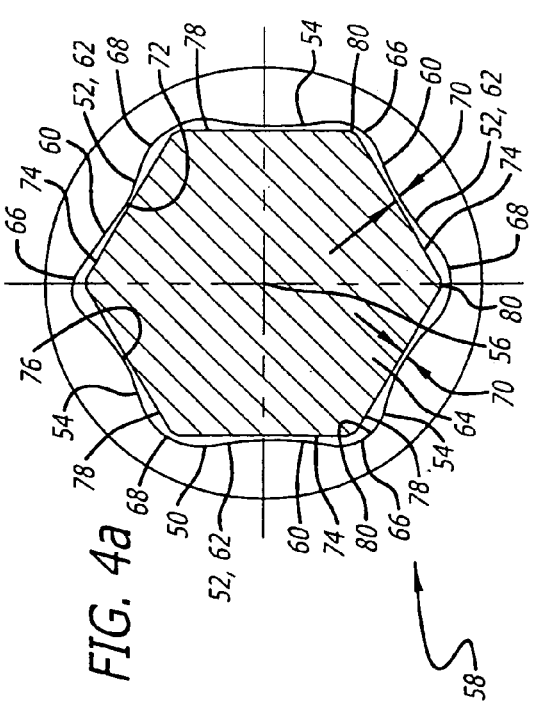

LOBED DRIVE FOR HI-LITE FASTENER

RELATED APPLICATIONS

This is a continuation of Ser. No. 10/171,475 filed Jun. 13, 2002, now U.S. Pat. No. 6,736,580, which is a continuation-in-part of the application Ser. No. 10/052,238 by Dennis Schultz entitled LOBED DRIVE FOR HI-LITE FASTENER filed Jan. 16, 2002, now U.S. Pat No. 6,655,888.

BACKGROUND OF THE INVENTION

1. Field of the Invention

This invention relates generally to structural fasteners, and more particularly relates to drive sockets on threaded male structural fasteners.

2. Description of the Related Art

Threaded male structural fasteners of the type to which this invention is directed include an axial drive socket, or wrench engaging recess, located either on a head (FIG. 1a) of the fastener or on the opposite end of the fastener (FIG. 1b). The drive socket (FIG. 1c) includes a plurality of substantially equally spaced and sized flat surfaces which receive a mating wrench type key, or wrench key. The drive socket may be hexagonally shaped to receive a hexagonal Allen wrench type key, or hex-key driver. During use, an end of the wrench key is inserted into the drive socket in the male fastener and is either held in place to permit a threaded female fastener, such as a nut, to be screwed onto the threads of the male fastener, or the hex-key driver is rotated in order to screw the male fastener into the female fastener or other female threaded hole.

Clearance is required between a hex-key driver and the drive socket which the hex-key driver is inserted into. For example, the clearance between a 2.4 mm (3/32-inch) hexagonal drive socket and a 2.4 mm (3/32-inch) hex-key driver is 0.04 mm (0.0015 inch) all around. With this amount of clearance, the hex-key driver can rotate approximately three degrees before contacting the mating surfaces of the drive socket (FIG. 1d), resulting in the intersections, or corners, between the surfaces of the hex-key driver contacting the flat surfaces of the drive socket. With the corners between the surfaces of the hex-key driver providing the main driving force from the hex-key driver, high stress concentrations are placed on the corners of the hex-key driver, but there is very little material providing support for the corners. As a result, when a load that is sufficient to set the desired torque between the male threaded fastener and the female threaded fastener or part is applied to a hex-key driver during use, the material at the corners may shear off of the hex-key driver, leaving the hex-key driver in a stripped condition.

Another problem that can occur is that as the hex-key driver is rotated within the drive socket, the hex-key driver may become wedged within the socket, thus causing the hex-key driver to bind within the socket. After setting the desired torque between the male threaded fastener and the female threaded fastener, rotation of the hex-key driver must be reversed to break the bind between the hex-key driver and the socket.

Methods which have been developed to prevent the stripping of hex-key drivers during use include fabricating the hex-key drivers from stronger materials. Yet, making the hex-key driver stronger may lead to stripping the drive socket during high stress applications. Another method of preventing hex-key drivers from stripping includes making the drive sockets in the fasteners deeper. However, making the drive socket deeper may compromise tensile strength of the fastener through the area of the drive socket, especially on fasteners having the drive socket on the end of the fastener opposite the head (FIG. 1b).

One attempt to alleviate the problem of the hex-key drivers stripping within the drive sockets included reconfiguring the drive socket to include six rounded lobes of substantially equal radius, as depicted in FIG. 2a. The lobes are located substantially equidistant from the center of the fastener. Also, adjacent lobes are located substantially equidistant circumferentially from each other. Each of the lobes projects inward toward the center of the fastener. The embodiment also includes curved recesses located between and adjacent each lobe, thereby combining for a total of six recesses. Each of the recesses is blended into its adjacent lobes to form a substantially smooth transition between the lobes and the recesses.

Referring to FIG. 2b, when the hex-key driver is rotated, such as to drive the male threaded fastener relative to a female threaded fastener, a portion of the flats on the hex-key driver contact the lobes while the corners of the hex-key driver remain within the recesses and out of contact with the wall of the drive socket. One problem with the configuration of FIGS. 2a and 2b is that it enlarges the drive socket considerably, thereby weakening the fastener head.

Hence, those skilled in the art have recognized a need for a male threaded fastener having a drive socket that may receive high stress from a hex-key driver and reduce the tendency of the hex-key driver to strip or to bind within the drive socket. The need to configure the drive socket so that it substantially maintains the tensile strength of male threaded fasteners and the strength of the fastener heads has also been recognized. The present invention fulfills these needs and others.

SUMMARY OF THE INVENTION

Briefly, and in general terms, the present invention is directed to a drive socket for a fastener which is driven by a hex-key driver. In one presently preferred embodiment, the drive socket includes three rounded lobes of substantially equal radius. The three lobes are positioned about a center of the fastener and are located substantially equidistant from the center and approximately 120° apart from each other. The drive socket also includes three flat surfaces positioned about the center of the fastener. Each flat surface is located substantially opposite one of the lobes and substantially equidistant from the center of the fastener. The drive socket further includes recesses which are located between the lobes and the flat surfaces.

In one currently preferred aspect of the invention, the lobes project inward toward the center of the fastener. Each of the recesses forms a substantially smooth transition between a lobe and a flat surface. The lobes are positioned to provide a first clearance between an apex of each of the lobes and corresponding surfaces on a hex-key driver inserted into the drive socket. The flat surfaces are positioned to provide a second clearance between the flat surfaces and corresponding surfaces on the hex-key driver. In one currently preferred embodiment, the first clearance is approximately 0.04 mm (0.0015 inch) and the second clearance is approximately 0.10 mm (0.0038 inch). In another currently preferred embodiment, the recesses are sized to provide sufficient clearance such that the corners of a hex-key driver inserted into the drive socket do not contact a wall of the drive socket.

In another presently preferred embodiment, the drive socket of the present invention includes a first set of three lobes of substantially equal radius which are positioned about a center of the fastener. The lobes within the first set are substantially equidistant from the center of the fastener and approximately 120° apart from each other. Each of the lobes of the first set includes a flat surface which is located adjacent and substantially tangential to the radius portion of the lobe. The drive socket also includes a second set of three lobes of substantially equal radius positioned about the center of the fastener. The lobes within the second set are substantially equidistant from the center of the fastener, approximately 120° apart from each other and approximately 60° apart from the lobes of the first set. The drive socket further includes recesses located between the lobes of the first set and the lobes of the second set.

In one currently preferred aspect of the invention, each of the lobes of the first set and each of the lobes of the second set projects inward toward the center of the fastener. In another currently preferred aspect of the invention, the radius of the lobes of the first set and the radius of the lobes of the second set are substantially equal. The distance between the lobes of the first set and the center of the fastener and the distance between the lobes of the second set and the center of the fastener are also substantially equal. Each of the recesses forms a substantially smooth transition between the lobes of the first set and the lobes of the second set. The recesses are sized to provide sufficient clearance such that the corners of a hex-key driver inserted into the drive socket do not contact a wall of the drive socket. The flat surfaces of the lobes in the first set are positioned substantially 120° apart from each other.

In another currently preferred aspect of the invention, the lobes of the first set are positioned to provide a clearance between an apex of each of the lobes of the first set and corresponding surfaces on a hex-key driver inserted into the drive socket. Similarly, the lobes of the second set are positioned to provide a clearance between an apex of each of the lobes of the second set and corresponding surfaces on the hex-key driver inserted into the drive socket. The clearance between the surfaces on the hex-key driver and the lobes of the first set and the lobes of the second set is approximately 0.04 mm (0.0015 inch).

In a further preferred embodiment of the invention, a drive socket of a fastener includes a plurality of rounded lobes of substantially equal radius. The lobes are positioned about a center of the fastener and are located substantially equidistant from the center and a substantially equal distance from each other. Each of the lobes projects inward toward the center of the fastener. The lobes are positioned to provide a first clearance of approximately 0.04 mm (0.0015 inch) between an apex of each of the lobes and corresponding surfaces on a key driver. The drive socket also includes a plurality of flat surfaces positioned about the center of the fastener with the number of flat surfaces being substantially equal to the number of lobes. Each flat surface is located substantially opposite one of the lobes and substantially equidistant from the center of the fastener. The flat surfaces are positioned to provide a second clearance of approximately 0.10 mm (0.0038 inch) between the flat surfaces and corresponding surfaces on the key driver inserted into the drive socket. The drive socket further includes recesses located between the lobes and the flat surfaces. Each of the recesses forms a substantially smooth transition between a lobe and a flat surface. The recesses are sized to provide sufficient clearance such that the corners of a key driver inserted into the drive socket do not contact a wall of the drive socket.

In an additional preferred embodiment, the drive socket of the present invention includes a first set of lobes of substantially equal radius positioned about a center of a fastener. The lobes within the first set are substantially equidistant from the center of the fastener and a substantially equal distance from each other. Each of the lobes of the first set includes a flat surface which is located adjacent and substantially tangential to the radius portion of the lobe. The flat surfaces of the lobes of the first set are positioned from each other at an angle substantially equal to 360° divided by the number of lobes contained within the first set of lobes. Each of the lobes of the first set projects inward toward the center of the fastener and is positioned to provide a clearance of approximately 0.04 mm (0.0015 inch) between an apex of the lobe and a corresponding surface on a key driver.

The drive socket also includes a second set of lobes of substantially equal radius positioned about the center of the fastener. The number of lobes contained within the second set of lobes is substantially equal to the number of lobes contained within the first set of lobes. The lobes within the second set are substantially equidistant from the center of the fastener and a substantially equal distance from each other. The lobes of the second set alternate substantially evenly between the lobes of the first set. The lobes of the second set project inward toward the center of the fastener and are positioned to provide a second clearance of approximately 0.04 mm (0.0015 inch) between an apex of each of the lobes of the second set and corresponding surfaces on a key driver inserted into the drive socket.

The drive socket further includes recesses between the lobes of the first set and the lobes of the second set with each of the recesses forming a smooth transition therebetween. The recesses are sized to provide sufficient clearance such that the corners of a key driver inserted into a drive socket do not contact a wall of the drive socket.

From the above, it may be seen that the present invention provides for configurations of drive sockets for fasteners which reduce the tendency of a key driver, such as a hex-key driver, to strip or to bind within the drive socket. Further, it may also be seen that the drive socket substantially maintains the tensile strength of the fastener and the strength of the fastener head. These and other aspects and advantages of the invention will become apparent from the following detailed description and the accompanying drawings, which illustrate by way of example the features of the invention.

BRIEF DESCRIPTION OF THE DRAWINGS

FIG. 3a is a plan view of a drive socket having three lobes and three flat surfaces with a hex-key driver inserted within the drive socket.

FIG. 3b is a plan view of the drive socket of FIG. 3a with the hex-key driver rotated within the drive socket.

FIG. 4a is a plan view of a drive socket having six lobes with three of the lobes including a flat surface with a hex-key driver inserted within the drive socket.

FIG. 4b is a plan view of the drive socket of FIG. 4a with the hex-key driver rotated within the drive socket.

DETAILED DESCRIPTION OF THE PREFERRED EMBODIMENTS

Figure 1D:
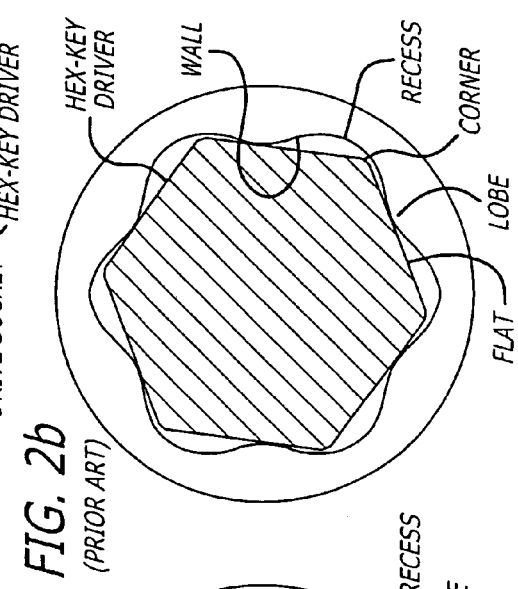
FIG. 1d is a plan view of the drive socket of FIG. 1c with the hex-key driver rotated within the drive socket.

As shown in the drawings for purposes of illustration, the invention is embodied in a drive socket for a male threaded fastener. Referring to the drawings, in which like reference numerals are used to designate like or corresponding elements among the several figures, FIG. 3a depicts a drive socket 20 of the present invention. The drive socket 20 includes three rounded lobes 22 of substantially equal radius. The lobes 22 are located substantially equidistant from the center 24 of the fastener 26, as well as substantially equidistant circumferentially from each other. Each of the lobes 22 projects inward toward the center 24 of the fastener 26. The drive socket 20 may also include three flat surfaces 28, each flat surface being located substantially opposite one of the lobes 22 and substantially equidistant from the center 24 of the fastener 26.

The drive socket 20 of one currently preferred embodiment may also include curved recesses 30 between the lobes 22 and the flat surfaces 28, thereby combining for a total of six recesses. Each of the recesses 30 may be blended into its adjacent lobe 22 and flat surface 28 to form a substantially smooth transition between the recesses and the lobes and between the recesses and the flat surfaces.

The lobes 22, flat surfaces 28 and recesses 30 of the drive socket 20 are spaced from the center 24 of the fastener 26 such that when a hex-key driver 32 is inserted into the drive socket, there is a first clearance 34 between an apex 36 of each of the lobes and a first set of alternating flat surfaces 38 on the hex-key driver. In one currently preferred embodiment, the first clearance 34 is approximately 0.04 mm (0.0015 inch). A second clearance 40 is also provided between the flat surfaces 28 of the drive socket 20 and a second set of alternating flat surfaces 42 on the hex-key driver 32. In one currently preferred embodiment, the second clearance 40 is approximately 0.10 mm (0.0038 inch). Also, the recesses 30 provide sufficient clearance such that the corners 44 of the hex-key driver 32 do not contact the wall 46 of the drive socket 20.

Referring to FIG. 3b, when the hex-key driver 32 is rotated clockwise, such as to drive the male threaded fastener 26 relative to a female threaded fastener, a portion of each of the flat surfaces of the first set of alternating flat surfaces 38 on the hex-key driver contacts the lobes 22 in the drive socket 20 while the corners 44 of the hex-key driver remain out of contact with the wall 46 of the drive socket. The corners 44 of the hex key driver 32 may either remain within the recesses 30 or move to a location proximate the flat surfaces 28 of the drive socket 20. In one currently preferred embodiment, the hex-key driver 32 may rotate approximately 6° prior to contact between the first set of alternating flat surfaces 38 on the hex-key driver and the lobes 22 with the lobes contacting the first set of alternating flat surfaces on the hex-key driver approximately one-third of the distance across the surfaces from the corners 44 of the hex-key driver. As a result, a relatively large amount of material supports the hex-key driver 32 behind the three contact points between the hex-key driver and the lobes 22 in comparison to the prior art hexagonal drive socket (FIGS. 1c and 1d).

Counterclockwise rotation of the hex-key driver 32 (not shown), such as to unscrew the male threaded fastener 26, creates substantially equivalent contact between the drive socket 20 and the hex-key driver as when the hex-key driver is rotated clockwise. Hence, a portion of each of the flat surfaces of the first set of alternating flat surfaces 38 on the hex-key driver contacts the lobes 22 in the drive socket 20 while the corners 44 of the hex-key driver remain out of contact with the wall 46 of the drive socket. Contact between the lobes 22 and the first set of alternating flat surfaces 38 occurs approximately one-third of the distance across the surfaces from the corners 44 of the hex-key driver 32.

Figure 2B:
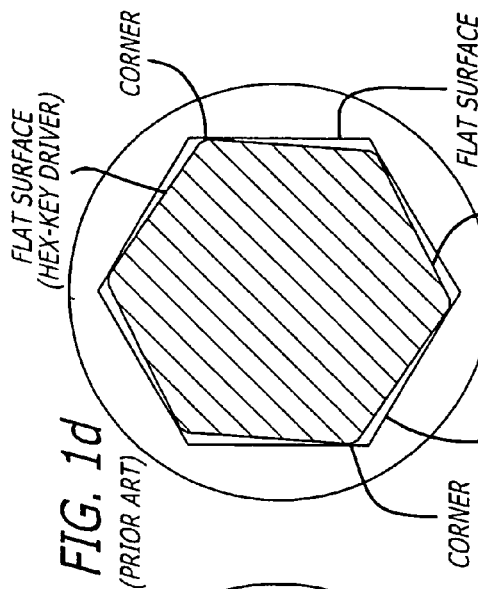
FIG. 2b is a plan view of the head of FIG. 3a with the hex-key driver rotated within the drive socket.
Figure 1C:
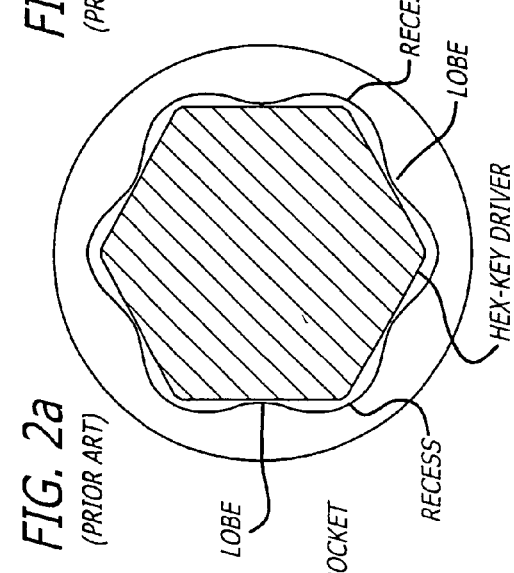
FIG. 1c is a plan view of the drive socket of FIG. 1b depicting the drive socket with a hex-key driver inserted within the drive socket.
Figure 2A:
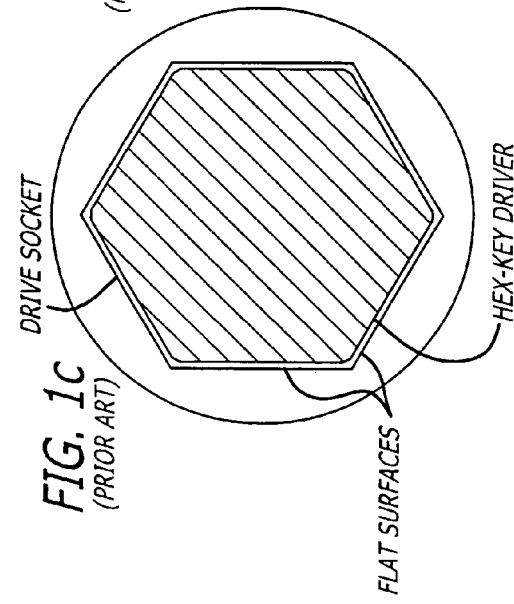
FIG. 2a is a plan view of the head of a prior art fastener depicting a drive socket having six lobes and six recesses with a hex-key driver inserted within the drive socket.
Figure 1A:
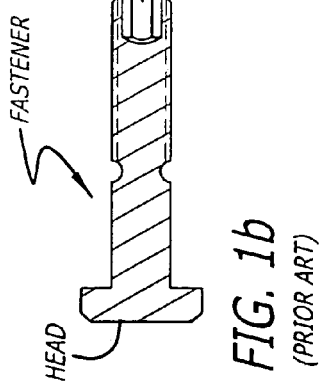
FIG. 1a is section view of an embodiment of a prior art fastener depicting a hexagon shape drive socket positioned at the head of the fastener.
Figure 1B:
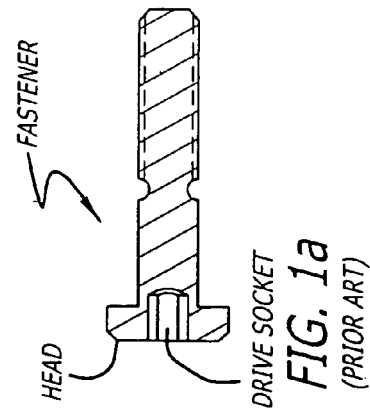
FIG. 1b is a section view of an embodiment of a prior art fastener depicting a hexagon shape drive socket positioned at an end of the fastener opposite the head.

By eliminating contact between the corners 44 of the hex-key driver 32 and the wall 46 of the drive socket 20, as depicted in FIGS. 3a and 3b, wear to the hex-key driver is significantly reduced in comparison to the use of the prior art drive socket of FIG. 1c. Due to the reduction of wear to the hex-key driver 32 by the configuration of the drive socket 20, the depth of the drive socket may be reduced in comparison to the prior art drive socket. Further, the inclusion of the flat surfaces 28 reduces the amount of material removed from the fastener 26 in comparison to the prior art drive socket depicted in FIGS. 2a and 2b. Reducing the amount of material removed from the fastener 26 aids in maximizing the strength of the fastener 26.

Referring to FIG. 4a, another currently preferred embodiment of a drive socket 50 includes a first set of three lobes 52 and a second set of three lobes 54, for a total of six lobes, each lobe being of substantially equal radius. The lobes 52, 54 are located substantially equidistant from the center 56 of the fastener 58. The lobes 52 of the first set are approximately 120° apart from each other. The lobes 54 of the second set are also approximately 120° apart from each other and alternate between the lobes 52 of the first set so that each lobe 52 from the first set is approximately 60° apart from a lobe 54 of the second set. Each of the lobes 52, 54 projects inward toward the center 56 of the fastener 58. Each of the lobes 52 within the first set includes a flat surface 60 which is located adjacent and substantially tangential to the radius portion 62 of the lobe 52. The flat surfaces 60 are positioned such that they are substantially 120° apart from each other. The flat surfaces 60 on the lobes 52 of the first set and the lobes 54 of the second set function as contact surfaces for a hex-key driver 64 during clockwise rotation of the fastener.

The drive socket 50 of the present invention may also include a first set of curved recesses 66 and a second set of curved recesses 68 between the lobes 52 of the first set and the lobes 54 of the second set, thereby combining for a total of six recesses. However, the recesses 66 of the first set, which are located between the flat surfaces 60 on the lobes 52 of the first set and the adjacent lobes 54 of the second set may be a different size than the recesses 68 of the second set which are located between the radius portions 62 of the lobes 52 of the first set and the adjacent lobes 54 of the second set. Each of the first 66 and second 68 sets of recesses may be blended into the first 52 and second 54 sets of lobes to form a substantially smooth transition between the recesses and lobes.

The first 52 and second 54 sets of lobes and first 66 and second 68 sets of recesses of the drive socket 50 are spaced from the center 56 of the fastener 58 such that when the hex-key driver 64 is inserted into the drive socket 50, there is a clearance 70 between the hex-key driver and the drive socket. More particularly, there is a clearance 70 between a first apex 72 on each of the lobes 52 of the first set and a first set of alternating flat surfaces 74 on the hex-key driver. There is a substantially equal clearance 70 between a second apex 76 on each of the lobes 54 of the second set and a second set of alternating flat surfaces 78 on the hex-key driver. In one currently preferred embodiment, the clearance 70 is approximately 0.04 mm (0.0015 inch). Also, the first 66 and second 68 sets of recesses provide sufficient clearance such that the corners 80 of the hex-key driver 64 do not contact the wall 82 of the drive socket 50.

Referring to FIG. 4*b*, when the hex-key driver 64 is rotated clockwise, such as to drive the male threaded fastener 58 relative to a female threaded fastener, the first set of alternating flat surfaces 74 on the hex-key driver contact the flat surfaces 60 of the first set of lobes 52 in such manner that there is substantially surface-to-surface contact between the first set of alternating flat surfaces on the hex-key driver and the flat surfaces of the first set of lobes. Further, the second set of alternating flat surfaces 78 on the hex-key driver 64 contacts the three lobes 54 of the second set. The corners 80 of the hex-key driver 64, however, remain within the first 66 and second 68 set of recesses and out of contact with the wall 82 of the drive socket 50. In one currently preferred embodiment, the hex-key driver 64 may rotate approximately 6° prior to contact between the first 74 and second 78 sets of alternating flat surfaces on the hex-key driver and the first 52 and second 54 set of lobes of the drive socket 50. In this manner, the flat surfaces 60 of the first set of lobes 52 may have surface contact with the surfaces of the first set of alternating flat surfaces 74 on the hex-key driver 64 between the corner 80 of the hex-key driver to a location approximately one-third of the distance across the surfaces of the first set of alternating flat surfaces. Also, the lobes 54 of the second set may contact the surfaces of the second set of alternating flat surfaces 78 at a location approximately one-third of the distance across the surfaces of the second set of alternating flat surfaces from the corners 80 of the hex-key driver. As a result, similar to the use of the drive socket 20 in the embodiment depicted in FIGS. 3*a* and 3*b*, a relatively large amount of material supports the hex-key driver 64 behind the contact points and contact surfaces in comparison to the prior art hexagonal drive socket (FIGS. 1*c* and 1*d*).

With the surface contact created between the flat surfaces 60 of the first set of lobes 52 and the first set of alternating flat surfaces 74 of the hex-key driver 64 during clockwise rotation of the hex-key driver, the likelihood of the hex-key driver binding is significantly reduced in comparison to the prior art drive sockets (FIG. 1*c*). With the reduction of binding of the hex-key driver 64 within the drive socket 50, there is less need to reverse the rotation direction of the hex-key driver to break the bind prior to removing the hex-key driver from the drive socket. Further, the reduction of binding reduces the amount of wear to the hex-key driver 64 during use.

When the hex-key driver 64 is rotated counterclockwise (not shown), such as to unscrew the male threaded fastener 58, each of the first 74 and second 78 set of alternating flat surfaces on the hex-key driver 64 may contact a corresponding lobe from the first 52 or second 54 set of lobes while the corners 80 of the hex-key driver, again, remain within the first 66 and second 68 sets of recesses and out of contact with the wall 82 of the drive socket 50. The lobes 52, 54 of the first and second set contact the first 74 and second 78 sets of alternating flat surfaces on the hex-key driver 64 approximately one-third of the distance across the surfaces from the corners 80 of the hex-key driver.

By eliminating contact between the corners 80 of the hex-key driver 64 and the wall 82 of the drive socket 50, as depicted in FIGS. 4*a* and 4*b*, wear to the hex-key driver is significantly reduced in comparison to the prior art drive socket of FIG. 1*c*. Due to the reduction of wear of the hex-key driver 64 by the configuration of the drive socket 50, the depth of the drive socket may be reduced in comparison to the prior art drive socket. Reducing the depth of the drive socket 50, in turn, aids in maximizing the strength of the fastener 58.

The foregoing description of the preferred embodiments of the invention describe drive sockets for fasteners which are driven by hex-key drivers. However, it is to be understood that the invention is not limited to such configurations. The invention also applies to drive sockets which can be driven by key drivers having a fewer of greater number of sides, such as a square-key driver or an octagon-key driver, for example, by correspondingly increasing or decreasing the number of lobes and recesses within the drive socket.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a drive socket of a threaded male fastener which is driven by a key wrench driver having a plurality of flat surfaces and a plurality of corners at intersections between the plurality of flat surfaces, the improvement comprising:
a plurality of rounded lobes defined in the drive socket, said plurality of rounded lobes being positioned about a center of the drive socket of the fastener, said plurality of rounded lobes including contact surfaces, the plurality of rounded lobes receiving a set of alternating ones of said plurality of flat surfaces of the key wrench driver;
a plurality of flat non-contact sections defined in the drive socket, said plurality of flat non-contact sections being positioned about the center of the fastener and including non-contact surfaces, each non-contact section being located between adjacent rounded lobes and substantially opposite one of the rounded lobes, and the plurality of corners of the key wrench driver remaining out of contact with said plurality of flat non-contact sections; and
curved recesses defined in the drive socket, said curved recesses transitioning between the flat non-contact sections and the adjacent rounded lobes, and the plurality of corners of the key wrench driver remaining out of contact with said curved recesses.

2. The drive socket of claim 1, wherein each of the rounded lobes projects inward toward the center of the fastener.

3. The drive socket of claim 1, wherein the rounded lobes are positioned to provide a first clearance between an apex of each of the rounded lobes and corresponding surfaces on a key wrench driver inserted into the drive socket, and the flat non-contact sections are positioned to provide a second clearance between the flat non-contact sections and corresponding surfaces on the key wrench driver.

4. The drive socket of claim 3, wherein:
the first clearance is approximately 0.04 mm (0.0015 inch); and the second clearance approximately 0.10 mm (0.0038 inch).

5. The drive socket of claim 1, wherein the recesses are sized to provide sufficient clearance such that the corners of a key wrench driver inserted into the drive socket do not contact a wall of the drive socket.

* * * * *